United States Patent [19]

Peterson

[11] Patent Number: 5,480,674
[45] Date of Patent: Jan. 2, 1996

[54] FLAVOR COMPOSITION FOR AN ORAL ELECTROLYTE REHYDRATION SOLUTION

[75] Inventor: Robert J. Peterson, Imlaystown, N.J.

[73] Assignee: Firmenich Incorporated, Plainsboro, N.J.

[21] Appl. No.: 346,355

[22] Filed: Nov. 29, 1994

Related U.S. Application Data

[63] Continuation of Ser. No. 83,002, Jun. 25, 1993, abandoned.

[51] Int. Cl.$^6$ .................................. A23L 1/22; A23L 2/00
[52] U.S. Cl. ..................... 426/534; 426/590; 426/801
[58] Field of Search ..................................... 426/534, 801, 426/590

[56] References Cited

U.S. PATENT DOCUMENTS

| | | | |
|---|---|---|---|
| 3,890,370 | 6/1975 | Buchi et al. | 260/468 L |
| 3,931,326 | 1/1976 | Kovats et al. | 260/586 R |
| 4,382,972 | 5/1983 | Willis et al. | 426/536 |
| 4,659,510 | 4/1987 | Ohnishi et al. | 252/522 R |
| 4,871,550 | 10/1989 | Millman | 424/601 |
| 5,114,723 | 5/1992 | Stray-Gundersen . | |

OTHER PUBLICATIONS

Merory, Food Flavorings, 1960, Avi; Westport, Conn., p. 188.
Aretander, Perfume and Flavor Chemicals, vol. I, 1969, Monograph Nos. 1178, 1183, 1292, Published by the Author: Montclair, N.J.

*Primary Examiner*—Helen Pratt
*Attorney, Agent, or Firm*—Ware, Fressola, Van Der Sluys & Adolphson

[57] ABSTRACT

A flavor composition for an oral electrolyte hydrate solution comprises ethyl esters, citrus oil concentrates, and sweet and fruity flavor components. Ethyl esters are used instead of more typical allyl esters because they are innocuous in dehydrated children whose health may be compromised. The ethyl esters are selected from ethyl acetate, ethyl butyrate, ethyl caproate, ethyl 2-methylbutyrate and ethyl heptanoate. The flavor composition provides an innocuous tutti-frutti (bubble gum) flavor to the oral electrolyte hydrate solution.

4 Claims, No Drawings

FLAVOR COMPOSITION FOR AN ORAL ELECTROLYTE REHYDRATION SOLUTION

This is a continuation of application Ser. No. 08/083,002 filed on Jun. 25, 1993 and now abandoned.

TECHNICAL FIELD

The present invention comprises a flavor composition for an oral electrolyte rehydration solution. The present invention imparts a tutti-frutti or bubble gum like flavor to the oral electrolyte rehydration solution to make the rehydrate solution more palatable to infants and young children.

BACKGROUND OF THE INVENTION

Oral electrolyte rehydration solutions are typically used to correct, manage, or prevent the progress of dehydration that may occur in acute childhood diarrhea of infants or young children. An example of such an oral electrolyte rehydration solution may be found in Belgian Patent Document No. 1001185 entitled "Oral Composition for Rehydration and Nutrition Especially Of Young Children." However, many infants or young children are reluctant to take these oral electrolyte rehydration solutions, as well as many other orally administered medications, because they find such solutions distasteful. With respect to oral electrolyte rehydration solutions, the reluctance is due, at least in part, to the salty taste of the electrolyte salts in the rehydration solution. Reluctance by infants or young children to take such oral electrolyte rehydration solutions can prolong the symptoms, dangers, and discomfort of dehydration.

The reluctance by infants and small children to take oral medications of any type that are distasteful is a well recognized and wide-spread problem among all pediatric medication manufacturers. One example of an effort to overcome this reluctance is shown by the cough syrup manufacturers' provision of cherry flavored cough suppressant and decongestant syrup solutions. Because these flavored solutions appear to be more palatable to the infants and young children, their reluctance to taking such medication can usually be overcome.

In addition to cherry flavoring, tutti-frutti flavors (bubble gum like flavors) appear to be attractive to infants and young children. Some tutti-frutti flavors can contain allyl esters such as allyl butyrate, allyl caproate, allyl hexanoate and/or allyl caprylate. While these allyl esters are safe and acceptable flavor ingredients, they may exhibit somewhat elevated toxicity levels in infants or young children suffering from dehydration because they are in a compromised state of health and because the oral electrolyte rehydration solutions are necessarily structured to be attractive to them, there is an invitation to either intentional or accidental over-consumption. To reduce any risks, such allyl esters would generally not be preferable flavor components in combination with an oral electrolyte rehydration solution.

Thus, it is desirable to provide a flavor composition for an oral electrolyte rehydration solution that will make such a solution more palatable for infants and children. It is also preferable that the flavor composition for the oral electrolyte rehydration solution be innocuous if accidentally over-consumed.

SUMMARY OF THE INVENTION

The present invention provides a flavor composition for an oral electrolyte rehydration that will make such a solution innocuous and more palatable for infants and young children by substituting the allyl esters of a typical tutti-frutti flavor composition with ethyl esters that, in the composition of the present invention, still achieve a tutti-frutti flavor. The flavor composition of the present invention comprises an admixture of:

ethyl esters selected from the group consisting of ethyl acetate, ethyl butyrate, ethyl caproate, ethyl 2-methylbutyrate and ethyl heptanoate;

citrus oil concentrates selected from the group consisting of citral, orange oil terpeneless, orange oil 5-fold, mandarin oil, lemon oil and orange essence oil; and sweet and fruity flavor components selected from the group consisting of ethyl vanillin, ethyl praline, 4-Hydroxy-2,5-dimethyl-3(2H)-furanone, benzaldehyde, and amyl acetate.

Accordingly, it is an object of the present invention to provide an innocuous flavor composition for an oral electrolyte rehydration solution that will make the oral electrolyte rehydration solution palatable to infants and young children. This object is accomplished, at least in part, by the flavor composition of the present invention.

Other objects and advantages of the present invention will become apparent to those skilled in the art from the following detailed description read together with the claims appended hereto.

DETAILED DESCRIPTION OF THE INVENTION

The present invention provides a flavor composition for oral electrolyte rehydration solutions particularly suited for infants and young children who are generally reluctant to take any oral medications that are distasteful. The flavor composition when combined with the oral electrolyte rehydration solution imparts a generally tutti-frutti flavor to the electrolyte rehydration solution. This flavor is generally acceptable to infants and young children and eases the administration of the oral electrolyte rehydration solution to otherwise very reluctant recipients.

The flavor composition of the present invention comprises an admixture of one or more ethyl esters, one or more citrus oil concentrates, and one or more sweet and fruity flavor components. The flavor composition can be combined with an ordinary electrolyte rehydrate solution to make a flavored oral electrolyte rehydrate solution having a tutti-frutti (bubble gum) flavor that is innocuous if accidentally overconsumed.

The ethyl ester component of the flavor composition of the present invention includes, but is not limited to, ethyl acetate, ethyl butyrate, ethyl caproate, ethyl 2-methylbutyrate and ethyl heptanoate. The quantity of these ethyl esters that is preferred in the flavor composition of the present invention is between 8.5 weight percent and 50 weight percent. Of these ethyl esters, the preferred ethyl esters are ethyl acetate, ethyl butyrate and ethyl caproate. The preferred quantity of ethyl acetate is between 5 weight percent and 25 weight percent, while the preferred quantity of ethyl butyrate is between 3 weight percent and 20 weight percent and the preferred quantity of ethyl caproate is between 0.5 weight percent and 5 weight percent.

The citrus oil concentrate component of the flavor composition of the present invention includes, but is not limited to, citral, orange oil terpeneless, orange oil 5-fold, mandarin oil, lemon oil and orange essence oil. The quantity of these citrus oil concentrates that is preferred in the flavor composition of the present invention is between 5 weight percent and 40 weight percent.

The sweet and fruity flavor components of the flavor composition of the present invention includes, but is not limited to, ethyl vanillin, ethyl praline, Furaneol®, benzaldehyde and amyl acetate. Furaneol® is the U.S. registered trademark for a flavor ingredient 4-Hydroxy-2,5-dimethyl-3(2 H)-furanone manufactured by Firmenich Incorporated, One Firmenich Way, Plainsboro Road, Plainsboro, N.J. The quantity of these components of the present invention is between 10 weight percent and 86.5 weight percent.

The following specific example will illustrate the invention, and it will be appreciated that other examples will be apparent to those of ordinary skill in the art and that the invention is not limited to this specific illustrative example.

TABLE 1

| Components | Quantity (weight percent) |
| --- | --- |
| Ethyl vanillin | 5 |
| Ethyl praline | 5 |
| Furaneol ® | 5 |
| Citral | 3 |
| Orange oil terpeneless | 10 |
| Orange oil 5-fold | 10 |
| Ethyl butyrate | 10 |
| Ethyl acetate | 20 |
| Ethyl caproate | 1 |
| Benzaldehyde | 0.3 |
| Mandarin oil | 5 |
| Lemon oil | 3 |
| Amyl acetate | 0.7 |
| Ethyl 2-methylbutyrate | 5 |
| Orange essence oil | 10 |
| Ethyl Heptanoate | 7 |
| Total | 100 |

As will be readily appreciated by those skilled in the art, the components of the flavor composition of the present invention can be mixed together in any order and by any well known means at room temperature and atmospheric pressure conditions.

Thus, it can be seen from the foregoing specification and example that the present invention provides an innocuous flavor composition for an oral electrolyte hydrate solution for infants and young children.

The invention as described above admirably achieves the objects of the invention; however, it will be appreciated that the departures can be made by those skilled in the art without departing from the spirit and scope of the invention, which is limited only by the following claims.

What is claimed is:

1. An oral electrolyte rehydration solution having a flavoring composition mixed therewith, the flavoring composition comprising:

an ethyl ester component selected from the group consisting of ethyl acetate, ethyl butyrate, ethyl caproate, ethyl 2-methylbutyrate, ethyl heptanoate and mixtures thereof;

a citrus oil component selected from the group consisting of citral, orange oil terpeneless, orange oil 5-fold, mandarin oil, lemon oil, orange oil and mixtures thereof;

a sweet and fruity flavor component selected from the group consisting of ethyl vanillin, ethyl praline, benzaldehyde, amyl acetate and mixtures thereof; and 4-Hydroxy-2,5-dimethyl-3(2H)-furanone;

wherein said flavored oral electrolyte rehydration solution is free of allyl ester.

2. The oral electrolyte rehydration solution of claim 1, wherein 4-Hydroxy-2,5-dimethyl-3(2H)-furanone comprises 5 weight percent of the flavoring composition.

3. An oral electrolyte rehydration solution having a flavoring composition mixed therewith, the flavoring composition comprising:

approximately 43 weight percent of an ethyl ester component, the ethyl ester component selected from the group consisting of ethyl acetate, ethyl butyrate, ethyl caproate, ethyl 2-methylbutyrate, ethyl heptanoate, and mixtures thereof;

approximately 41 weight percent of a citrus oil concentrate component, the concentrate component selected from the group consisting of citral, orange oil terpeneless, orange oil 5-fold, mandarin oil, lemon oil, orange essence oil, and mixtures thereof;

approximately 11 weight percent of a sweet and fruity flavor component, the sweet and fruity flavor component selected from the group consisting of ethyl vanillin, ethyl praline, benzaldehyde, amyl acetate, and mixtures thereof;

approximately 5 weight percent 4-Hydroxy-2,5-dimethyl-3(2H)-furanone; and wherein said flavored oral electrolyte rehydration solution is free of allyl ester.

4. An oral electrolyte rehydration solution having a flavor composition mixed therewith, the flavoring composition comprising an admixture of:

5 weight percent ethyl vanillin;

5 weight percent ethyl praline;

5 weight percent 4-Hydroxy-2,5-dimethyl-3(2H)-furanone;

3 weight percent Citral;

10 weight percent orange oil terpeneless;

10 weight percent orange oil 5-fold;

10 weight percent ethyl butyrate;

20 weight percent ethyl acetate;

1 weight percent ethyl caproate;

0.3 weight percent benzaldehyde;

5 weight percent mandarin oil;

3 weight percent lemon oil;

0.7 weight percent amyl acetate;

5 weight percent ethyl 2-methylbutyrate;

10 weight percent orange essence oil;

7 weight percent ethyl heptanoate; and wherein said flavored oral electrolyte rehydration solution is free of allyl ester.

\* \* \* \* \*